United States Patent
Krzyzanowski et al.

(10) Patent No.: US 7,933,945 B2
(45) Date of Patent: Apr. 26, 2011

(54) METHOD, SYSTEM, AND COMPUTER PROGRAM PRODUCT FOR MANAGING CONTROLLED RESIDENTIAL OR NON-RESIDENTIAL ENVIRONMENTS

(75) Inventors: Paul Krzyzanowski, Fanwood, NJ (US); John A Trotter, Berkeley Heights, NJ (US); Daniel J Gittleman, Jackson, WY (US)

(73) Assignee: OpenPeak Inc.

( * ) Notice: Subject to any disclaimer, the term of this patent is extended or adjusted under 35 U.S.C. 154(b) by 1030 days.

(21) Appl. No.: 10/180,500

(22) Filed: Jun. 27, 2002

(65) Prior Publication Data

US 2004/0003051 A1    Jan. 1, 2004

(51) Int. Cl.
*G06F 15/16* (2006.01)
(52) U.S. Cl. ........ 709/200; 709/201; 709/217; 709/220; 709/227; 709/203; 700/19; 700/83
(58) Field of Classification Search .................. 709/201, 709/203, 208, 209, 217, 220, 227, 231, 237; 700/19, 83

See application file for complete search history.

(56) References Cited

U.S. PATENT DOCUMENTS

| | | | |
|---|---|---|---|
| 5,414,426 A | 5/1995 | O'Donnell et al. | |
| 5,519,878 A | 5/1996 | Dolin, Jr. ...................... | 395/800 |
| 5,537,463 A | 7/1996 | Escobosa et al. | |
| 5,544,321 A | 8/1996 | Theimer et al. | |
| 5,552,917 A | 9/1996 | Darbee et al. | |
| 5,570,085 A | 10/1996 | Bertsch ..................... | 340/825.07 |
| 5,644,354 A | 7/1997 | Thompson et al. | |
| 5,689,353 A | 11/1997 | Darbee et al. | |
| 5,721,583 A | 2/1998 | Harada et al. | |
| 5,771,388 A | 6/1998 | Mondrik et al. | |
| 5,802,467 A | 9/1998 | Salazar et al. ................ | 455/420 |
| 5,805,812 A | 9/1998 | Fish et al. | |
| 5,875,108 A | 2/1999 | Hoffberg et al. | |
| 5,898,386 A | 4/1999 | Kaihatsu .................. | 340/825.69 |
| 5,926,108 A | 7/1999 | Wicks et al. ............. | 340/825.44 |
| 5,930,699 A | 7/1999 | Bhatia .......................... | 455/414 |
| 5,953,144 A | 9/1999 | Darbee et al. | |

(Continued)

FOREIGN PATENT DOCUMENTS

CN    1288540 A    3/2001

(Continued)

OTHER PUBLICATIONS

*Total Remote Software: Griffin Technology Downloads*, 1 page, printed from Internet-URL-http://www.griffintechnology.com/software/software_totalremote.html, (printed February 23, 2004).

(Continued)

*Primary Examiner* — Barbara N Burgess
(74) *Attorney, Agent, or Firm* — Sterne, Kessler, Goldstein & Fox P.L.L.C.

(57) ABSTRACT

A control server, or similar central processor, manages the distribution of data (including audio and video), voice, and control signals among a plurality of devices connected via a wired and/or wireless communications network. The devices include audio/visual devices (such as, televisions, monitors, PDAs, notepads, notebooks, MP3, portable stereo, etc.) as well as household appliances (such as, lighting, ovens, alarm clocks, etc.). The control server supports video/audio serving, telephony, messaging, file sharing, internetworking, and security. A portable controller allows a user to access and control the network devices from any location within a controlled residential and/or non-residential environment, including its surrounding areas. The controllers are enhanced to support location-awareness and user-awareness functionality.

6 Claims, 8 Drawing Sheets

U.S. PATENT DOCUMENTS

| | | | |
|---|---|---|---|
| 5,956,025 A | 9/1999 | Goulden et al. | |
| 5,956,487 A | 9/1999 | Venkatraman et al. | 395/200.48 |
| 5,959,751 A | 9/1999 | Darbee et al. | |
| 5,963,624 A | 10/1999 | Pope | |
| 6,005,861 A | 12/1999 | Humpleman | 370/352 |
| 6,026,150 A | 2/2000 | Frank et al. | 379/90.01 |
| 6,032,202 A | 2/2000 | Lea et al. | 710/8 |
| 6,049,711 A | 4/2000 | Ben-Yehezkel et al. | 455/414 |
| 6,052,750 A | 4/2000 | Lea | 710/72 |
| 6,085,236 A | 7/2000 | Lea | 709/220 |
| 6,111,569 A | 8/2000 | Brusky et al. | |
| 6,131,028 A | 10/2000 | Whitington | 455/435 |
| 6,148,205 A | 11/2000 | Cotton | 455/435 |
| 6,154,745 A | 11/2000 | Kari et al. | 707/100 |
| 6,167,046 A | 12/2000 | Terada et al. | 370/389 |
| 6,170,007 B1 | 1/2001 | Venkatraman et al. | 709/218 |
| 6,198,479 B1 | 3/2001 | Humpleman et al. | 345/329 |
| 6,199,066 B1 | 3/2001 | Glitho et al. | |
| 6,199,136 B1 | 3/2001 | Shteyn | 710/129 |
| 6,208,341 B1 | 3/2001 | Van Ee et al. | |
| 6,208,855 B1 | 3/2001 | Tanaka | |
| 6,208,866 B1 | 3/2001 | Rouhollahzadeh et al. | 455/456 |
| 6,218,931 B1 | 4/2001 | Asghar et al. | 340/310.02 |
| 6,222,530 B1 | 4/2001 | Sequeira | |
| 6,223,348 B1 | 4/2001 | Hayes et al. | |
| 6,236,335 B1 | 5/2001 | Goodwin, III | |
| 6,243,707 B1 | 6/2001 | Humpleman et al. | 707/102 |
| 6,243,772 B1 | 6/2001 | Ghori et al. | 710/68 |
| 6,259,707 B1 | 7/2001 | Dara-Abrams et al. | 370/486 |
| 6,266,612 B1 | 7/2001 | Dussell et al. | 701/207 |
| 6,275,865 B1 | 8/2001 | Zou | 709/313 |
| 6,282,714 B1 | 8/2001 | Ghori et al. | 725/81 |
| 6,288,716 B1 | 9/2001 | Humpleman et al. | 345/329 |
| 6,292,554 B1 | 9/2001 | Oden et al. | |
| 6,317,028 B1 | 11/2001 | Valiulis | 340/10.1 |
| 6,317,718 B1 | 11/2001 | Fano | 705/1 |
| 6,321,092 B1 | 11/2001 | Fitch et al. | 455/456 |
| 6,349,352 B1 | 2/2002 | Lea | 710/72 |
| 6,359,636 B1 | 3/2002 | Schindler et al. | 345/846 |
| 6,363,434 B1 | 3/2002 | Eytchison | 709/313 |
| 6,388,399 B1 | 5/2002 | Eckel et al. | |
| 6,405,261 B1 | 6/2002 | Gaucher | |
| 6,434,644 B1 | 8/2002 | Young et al. | |
| 6,459,217 B1 | 10/2002 | Belliveau | |
| 6,463,343 B1 * | 10/2002 | Emens et al. | 700/83 |
| 6,496,135 B1 | 12/2002 | Darbee | |
| 6,505,121 B1 | 1/2003 | Russell | |
| 6,563,430 B1 * | 5/2003 | Kemink et al. | 340/825.49 |
| 6,587,067 B2 | 7/2003 | Darbee et al. | |
| 6,600,421 B2 | 7/2003 | Freeman | |
| 6,618,764 B1 | 9/2003 | Shteyn | |
| 6,642,852 B2 | 11/2003 | Dresti et al. | |
| 6,711,379 B1 | 3/2004 | Owa et al. | |
| 6,748,343 B2 * | 6/2004 | Alexander et al. | 702/188 |
| 6,792,323 B2 | 9/2004 | Krzyzanowski et al. | |
| 6,792,469 B1 | 9/2004 | Callahan et al. | |
| 6,874,130 B1 | 3/2005 | Baweja et al. | |
| 6,882,299 B1 | 4/2005 | Allport | |
| 6,912,429 B1 * | 6/2005 | Bilger | 700/19 |
| 6,914,551 B2 | 7/2005 | Vidal | |
| 6,937,140 B1 | 8/2005 | Outslay et al. | |
| 6,943,778 B1 | 9/2005 | Astala et al. | |
| 6,959,172 B2 | 10/2005 | Becker et al. | |
| 6,970,127 B2 | 11/2005 | Rakib | |
| 7,024,256 B2 | 4/2006 | Krzyzanowski et al. | |
| 7,062,221 B1 | 6/2006 | Christensen | |
| 7,088,952 B1 | 8/2006 | Saito et al. | |
| 7,111,320 B1 | 9/2006 | Novak | |
| 7,162,228 B2 | 1/2007 | Bleile et al. | |
| 7,184,848 B2 | 2/2007 | Krzyzanowski et al. | |
| 7,194,755 B1 | 3/2007 | Nakata et al. | |
| 7,230,563 B2 | 6/2007 | Vidal | |
| 7,315,886 B1 | 1/2008 | Meenan et al. | |
| 7,526,593 B2 * | 4/2009 | Mandal et al. | 710/310 |
| 7,577,973 B1 | 8/2009 | Kapner, III et al. | |
| 2001/0000194 A1 | 4/2001 | Sequeira | |
| 2001/0018663 A1 | 8/2001 | Dussell et al. | 705/9 |
| 2001/0036192 A1 | 11/2001 | Chiles et al. | 370/401 |
| 2001/0041561 A1 | 11/2001 | Ventulett et al. | 455/414 |
| 2001/0049275 A1 | 12/2001 | Pierry et al. | 455/414 |
| 2001/0049846 A1 | 12/2001 | Guzzi et al. | 8/158 |
| 2001/0053274 A1 | 12/2001 | Roelofs et al. | 386/46 |
| 2001/0054060 A1 | 12/2001 | Fillebrown et al. | 709/201 |
| 2001/0055954 A1 | 12/2001 | Cheng | 455/74.1 |
| 2001/0055978 A1 | 12/2001 | Herrod et al. | |
| 2002/0000092 A1 | 1/2002 | Sharood et al. | |
| 2002/0006788 A1 | 1/2002 | Knutsson et al. | 455/422 |
| 2002/0019984 A1 | 2/2002 | Rakib | 725/111 |
| 2002/0022991 A1 | 2/2002 | Sharood et al. | 705/14 |
| 2002/0031120 A1 | 3/2002 | Rakib | 370/386 |
| 2002/0033760 A1 | 3/2002 | Kobayashi | 340/825.52 |
| 2002/0034292 A1 | 3/2002 | Tuoriniemi et al. | 379/219 |
| 2002/0035403 A1 | 3/2002 | Clark et al. | 700/65 |
| 2002/0035404 A1 | 3/2002 | Ficco et al. | 700/65 |
| 2002/0035605 A1 | 3/2002 | McDowell et al. | 709/206 |
| 2002/0035621 A1 | 3/2002 | Zintel et al. | 709/220 |
| 2002/0036795 A1 | 3/2002 | Fujitani | 358/1.15 |
| 2002/0052138 A1 | 5/2002 | Janik | |
| 2002/0068984 A1 | 6/2002 | Alexander et al. | |
| 2002/0072356 A1 * | 6/2002 | Yamashita et al. | 455/420 |
| 2002/0078161 A1 | 6/2002 | Cheng | |
| 2002/0087746 A1 | 7/2002 | Ludtke et al. | |
| 2002/0180581 A1 | 12/2002 | Kamiwada et al. | |
| 2003/0040813 A1 | 2/2003 | Gonzales et al. | |
| 2003/0071117 A1 * | 4/2003 | Meade, II | 235/382.5 |
| 2003/0073411 A1 * | 4/2003 | Meade, II | 455/70 |
| 2003/0095791 A1 | 5/2003 | Barton et al. | |
| 2003/0103088 A1 | 6/2003 | Dresti et al. | |
| 2003/0105854 A1 | 6/2003 | Thorsteinsson et al. | |
| 2003/0136827 A1 | 7/2003 | Kaneko et al. | |
| 2003/0147624 A1 * | 8/2003 | Trajkovic et al. | 386/46 |
| 2003/0181168 A1 | 9/2003 | Herrod et al. | |
| 2003/0191826 A1 | 10/2003 | Bellinger et al. | |
| 2003/0210340 A1 | 11/2003 | Frederick Romanowich | |
| 2004/0003073 A1 | 1/2004 | Krzyzanowski et al. | |
| 2004/0023635 A1 | 2/2004 | Impson et al. | |
| 2004/0046677 A1 * | 3/2004 | Dresti et al. | 340/825.57 |
| 2004/0047347 A1 | 3/2004 | Worry et al. | |
| 2004/0054789 A1 | 3/2004 | Breh et al. | |
| 2004/0066308 A1 | 4/2004 | Sampsell | |
| 2004/0133704 A1 | 7/2004 | Krzyzanowski et al. | |
| 2004/0193449 A1 | 9/2004 | Wildman et al. | |
| 2004/0224638 A1 | 11/2004 | Fadell et al. | |
| 2004/0260407 A1 | 12/2004 | Wimsatt | |
| 2004/0267382 A1 | 12/2004 | Cunningham et al. | |
| 2005/0015764 A1 | 1/2005 | Gaur | |
| 2005/0055472 A1 | 3/2005 | Krzyzanowski et al. | |
| 2005/0108091 A1 | 5/2005 | Sotak et al. | |
| 2005/0143017 A1 | 6/2005 | Lopp et al. | |
| 2005/0151640 A1 | 7/2005 | Hastings | |
| 2005/0179531 A1 | 8/2005 | Tabe | |
| 2005/0253807 A1 | 11/2005 | Hohmann et al. | |
| 2005/0266878 A1 | 12/2005 | Lee et al. | |
| 2006/0009208 A1 | 1/2006 | Jang et al. | |
| 2006/0012488 A1 | 1/2006 | Hilbrink et al. | |
| 2006/0046653 A1 | 3/2006 | Kirbas | |
| 2006/0053447 A1 | 3/2006 | Krzyzanowski et al. | |
| 2006/0061958 A1 | 3/2006 | Solomon et al. | |
| 2006/0142880 A1 | 6/2006 | Deen et al. | |
| 2006/0218244 A1 | 9/2006 | Rasmussen et al. | |
| 2007/0042806 A1 | 2/2007 | Stepanian | |
| 2007/0123207 A1 | 5/2007 | Terlizzi | |
| 2007/0171091 A1 | 7/2007 | Nisenboim et al. | |
| 2008/0221715 A1 | 9/2008 | Krzyzanowski et al. | |
| 2009/0077589 A1 | 3/2009 | Boyer et al. | |
| 2010/0031295 A1 | 2/2010 | Krzyzanowski et al. | |

FOREIGN PATENT DOCUMENTS

| | | |
|---|---|---|
| EP | 0 813 138 A1 | 12/1997 |
| EP | 1 085 403 A2 | 3/2001 |
| EP | 1 096 453 A2 | 5/2001 |
| EP | 1 263 167 A1 | 12/2002 |
| EP | 1 359 524 A1 | 11/2003 |
| GB | 2 350 749 A | 6/2000 |
| JP | 06-225360 | 8/1994 |
| JP | 8-000751 A | 1/1996 |
| JP | 8-044986 A | 2/1996 |

| | | | |
|---|---|---|---|
| JP | 10-164449 A | 6/1998 |
| JP | 11-122678 A | 4/1999 |
| JP | 2001-092762 | 4/2001 |
| JP | 2002-044763 | 2/2002 |
| JP | 2002-176610 A | 6/2002 |
| JP | 2002-199625 A | 7/2002 |
| JP | 2002-237764 A | 8/2002 |
| WO | WO 99/56261 A1 | 11/1999 |
| WO | WO 00/17737 | 3/2000 |
| WO | WO 00/39964 | 7/2000 |
| WO | WO 00/39964 A1 | 7/2000 |
| WO | WO 00/56016 A1 | 9/2000 |
| WO | WO 01/78425 A1 | 10/2001 |
| WO | WO 02/063523 A1 | 8/2002 |
| WO | WO 03/045015 A2 | 5/2003 |

OTHER PUBLICATIONS

*Total Remote v2.0 user guide*, 29 pages, printed from Internet-URL-http://www.griffintechnology.com/downloads/pdf/manuals/Total_Remote_user_manual.pdf, (printed February 23, 2004).

International Search Report for International Application No. PCT/US03/20189, Issued on Oct. 29, 2003.

U.S. Appl. No. 11/826,126, titled "Method, system, and computer program product for managing controlled residential or non-residential environments," inventor Krzyzanowski et al., Jul. 12, 2007, 89 pages.

U.S. Appl. No. 11/826,142, titled "Method, system, and computer program product for managing controlled residential or non-residential environments," inventor Krzyzanowski et al., Jul. 12, 2007, 86 pages.

English language abstract of cited document FP 1 (Japanese Patent Publication No. 2002-044763, published Feb. 8, 2002, inventors Kayashima et al., 13 pages).

English language abstract of cited document FP2 (Japanese Patent Publication No. 2001-092762, published Apr. 6, 2001, inventor Kaihei Kuwata, 8 pages).

English language abstract of cited document FP3 (Japanese Patent Publication No. JP 06-225360, published Aug. 12, 1994, inventor Masami Katou, 8 pages).

Supplementary Partial European Search Report issued Jul. 17, 2007 for Application No. EP 04716866.

Search Report and Written Opinion for International Application No. PCT/US06/38044 mailed Jun. 19, 2008, 12 pages.

English language abstract of JP 11122678A published Apr. 30, 1999, 1 pg.

Notice of Final Rejection mailed Feb. 25, 2010 for Japanese Patent Application No. 2004-517889, 11 pgs.

Supplementary European Search Report mailed Feb. 18, 2010 for European Application No. 04813734.3-1244, 3 pgs.

Notice of Reasons for Rejection mailed Feb. 9, 2010 for Japanese Application No. 2006-508998, 11 pgs.

Supplemental European Search Report mailed May 18, 2010 for Application No. 06815786.6, 12 pgs.

Bantz, D. et al., "*Keyboard Device for Upper and Lower Case Keying without Shifting*," Feb. 1, 1979, IBM Technical Disclosure Bulletin, International Business Machines Corp., US, pp. 3845-3846.

First Examination Report mailed Feb. 1, 2010 for Application No. 03762083.8, 4 pages.

Notice of Reasons for Rejection mailed Jul. 27, 2010 for Japanese Application No. 2006-508998, 7 pgs.

* cited by examiner

METHOD, SYSTEM, AND COMPUTER PROGRAM PRODUCT FOR MANAGING CONTROLLED RESIDENTIAL OR NON-RESIDENTIAL ENVIRONMENTS

BACKGROUND OF THE INVENTION

1. Field of the Invention

The present invention relates generally to networking, and more specifically, to distributing information within a network.

2. Related Art

The dawn of the information age has revealed new and exciting opportunities for computer processing capabilities. Personal computers have been deployed in a variety of arenas to gain efficiencies, reduce cost, and increase productivity. Miniaturization and portability have made personal computers more accessible and a more valued tool in many business environments. Personal computers have also become a very useful tool in non-business environments, including educational institutions and homes.

Home computer networks are gaining increased popularity. Within a home, multiple personal computers can be connected together to permit a user to share files without having to manually carry a diskette from one room to another. The computer network also permits the user to share printers, fax machines, and other devices. Internet access facilities can also be provided to permit access to external networks and services. Thus, a user can operate a home computer to gain instant access to information from anywhere in the world.

Despite the increasing presence of home computer networks, several significant problems must be overcome. For example, installing a home network can be time extensive and expensive to deploy. Additionally, there is no easy method to integrate home computer networks with other residential devices, such as televisions, stereos, DVD players, and other home electronics. Being able to efficiently distribute digital audio/video (AV) data among personal computers and other AV devices (such as, televisions, DVD players, PVRs, etc.) is complicated by differing and evolving communications standards and/or formats.

Another significant challenge is being able to effectively control the networked residential devices. Although a remote control unit can be trained to send signals to components of an entertainment center (such as, a television, stereo, and VCR), there is no known central device that can communicate and control multiple personal computers and other analog and/or digital devices at a residence.

Although the combination of improved computer processing capabilities and global access to information has resulted in significant advancements in the information processing age, there exists a need for a simple, inexpensive, yet versatile system that can integrate the functions of multiple residential devices connected to a residential network.

SUMMARY OF THE INVENTION

The present invention provides a method, system and computer program product for managing a plurality of devices and/or applications within an environment, such as a home, business, school, etc, as well as its surrounding areas. A control center comprises one or more servers or processing systems, and enables centralized command and control of the devices and/or applications.

In embodiments of the present invention, the devices and/or applications include communications equipment (such as, telephones, intercoms, etc.), entertainment systems (such as, televisions, CD/DVD players, gaming applications, stereos, etc.), monitoring systems (such as, security cameras, baby monitors, etc.), security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning, humidifiers, dehumidifiers, air purifiers, light switches, light dimmers, etc.), or the like.

In embodiments of the present invention, the control center distributes information (including video, audio, voice, text, graphics, control messages, etc.) to and among the devices and/or applications. The control center supports video/audio serving, telephony, messaging, file sharing, internetworking, and/or security.

In embodiments of the present invention, a portable controller (such as a digital personal assistant, wireless notepad, etc.) enables a user to interact with the control center. Such interaction includes altering the configuration and performance of the other devices and/or applications. Accordingly, the portable controller provides remote access to other devices and/or applications, and enables the user to control their functions and/or operations from any location within the environment.

In embodiments of the present invention, the portable controllers are equipped with location-awareness and/or user-awareness functionality. As such, the control center has the ability to track and/or monitor the position of the portable controllers and enable personalized configurations based on the user identity.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Table of Contents

Figure 1:
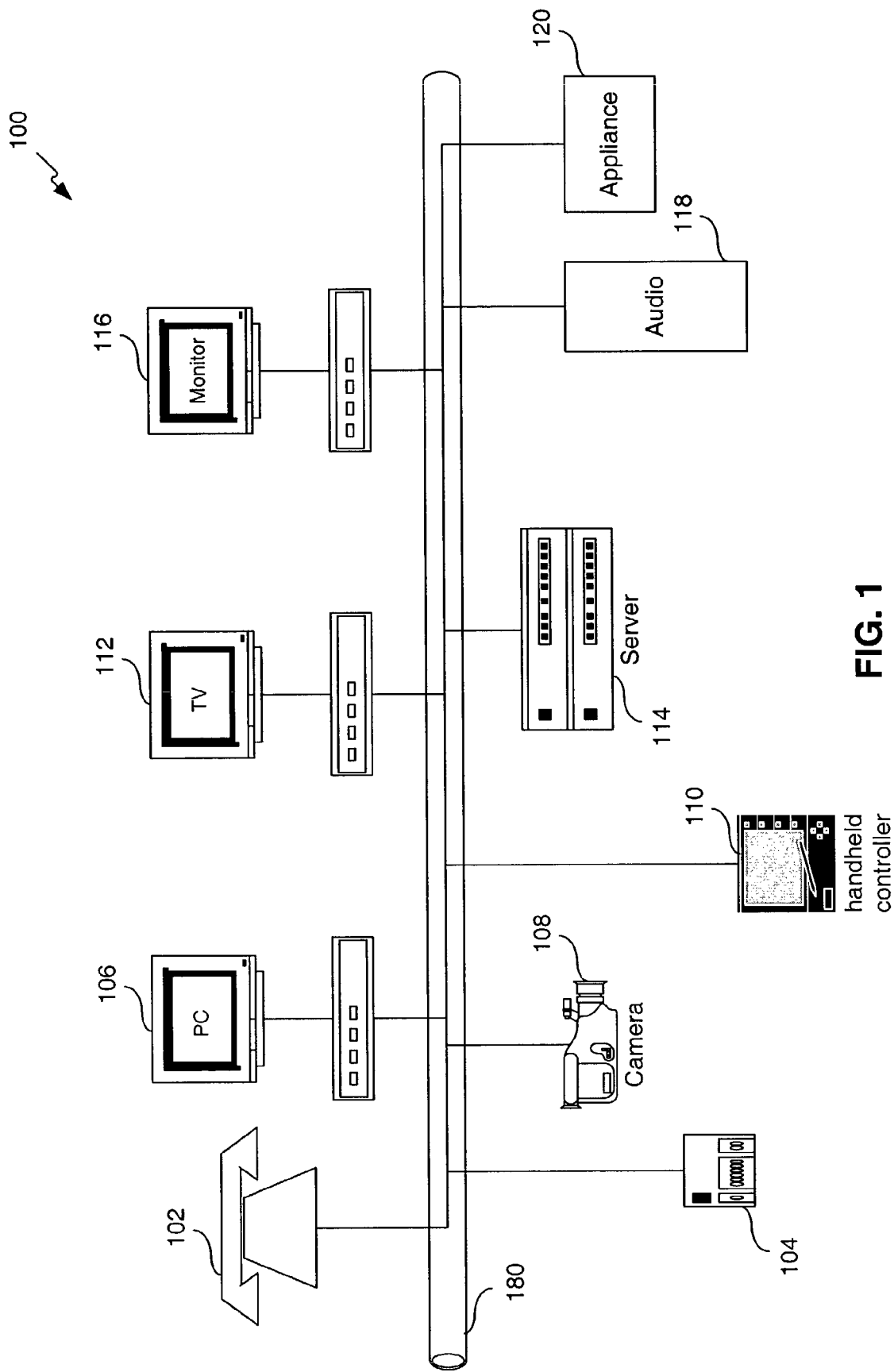
FIG. 1 illustrates a control system according to an embodiment of the present invention.

I. System Overview
II. Network Control System
III. Control Server and Archive
IV. Managing System Functions
V. Location Awareness
VI. Profiling Controller Client for Personalized Use
VII. Exemplary System Implementation

I. System Overview

The present invention is directed towards the centralized command and control of a plurality of devices and/or applications within a controlled environment, such as a home, business, school, etc. Therefore in embodiments of the present invention, the controlled environment is a residential environment. The residential environment pertains to the confines of a home, apartment, mobile home, houseboat, or other types of residences. However in embodiments, the residential environment includes the surrounding area of the residence, as well as any shelters, constructs, improvements, or the like, within a designated perimeter.

In other embodiments, the present invention is implemented in non-residential environments. A non-residential environment includes, but is not limited to, an office complex, suite of small offices, production studio, warehouse, entertainment arena, health care facility, hotel, vacation resort, aircraft, ship, automobile, or the like. In embodiments, the controlled environment for the non-residential embodiments include not only the actual confines of the aforementioned structures but also their surroundings within a designated perimeter.

Within the controlled environment of the present invention, one or more computer servers, or the like, provide a centralized command and control center for distributing information (including video, audio, voice, text, graphics, control messages, etc.) to the other devices and/or applications. Such devices and/or applications include communications equipment (such as, telephones, intercoms, etc.), entertainment systems (such as, televisions, CD/DVD players, gaming applications, stereos, etc.), monitoring systems (such as, security cameras, baby monitors, etc.), safety/security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning, humidifiers, dehumidifiers, air purifiers, light switches, light dimmers, etc.), power outlets, power supplies, or the like.

In an embodiment, a portable device (such as a digital personal assistant, wireless notepad, etc.) enables a user to interact with the centralized command and control center. Such interaction includes altering the configuration and performance of the other devices and/or applications within the controlled environment. Accordingly, the portable device provides remote access to other devices and/or applications, and enables the user to control their functions and/or operations from any location within the controlled environment.

For example, a user can operate the portable device to receive a recorded or live video from any location within the controlled environment. The video can be presented on a display coupled to the portable device or a monitor within the area that the user is presently located. Accordingly, the user would be able to watch a television program while lounging near a swimming pool or in a whirlpool bath. Additionally, the user would be able to view video from a baby monitor or a security camera on the portable display device or another display, such as a wireless notepad, desktop computer, television screen, etc.

In embodiments, a user is able to view or listen to media being presented on other televisions, personal computers, and/or audio systems. As such, a "parent" user can monitor television programs, web sites, and/or audio recordings that are being viewed by their children in other rooms. The present invention includes protocols that enable the parent user to block access to objectionable content.

In embodiments, a user is able to access the centralized command and control center through an external interface, such as the Internet. A user is able to gain access to devices and/or applications, that are located within the controlled environment, while the user is travelling or at work. Therefore, the present invention permits a user to log into the controlled environment to download or store files, receive feeds from surveillance equipment, open or secure locks on entry ways, or the like.

II. Network Control System

As discussed above, the present invention can be implemented in residential and/or non-residential controlled environments. By way of example, the following embodiments are described with reference to a residential environment. However, it should be understood that the following embodiments could be modified to include non-residential environments as well.

FIG. 1 illustrates a network control system 100 according to an embodiment of the present invention. The present invention contemplates analog and digital environments. System 100 is a scaleable, inexpensive, and versatile residential network. As shown, system 100 includes a communications network 180 that interconnects a plurality of system components. The system components include a telephone 102, a positioning unit 104, a computer client 106, a camera 108, a controller client 110, a television 112, a control server 114, a monitor 116, an audio client 118, and a residential appliance 120. Other devices and/or applications can also be included as a system component.

Control server 114 manages the distribution of information among the other system components. As described in greater detail below, control server 114 interacts with the other components to directly or indirectly distribute data (including audio and/or video), voice, and/or control messages over communications network 180. In an embodiment, control server 114 commands and controls the operation and/or functions of one or more of the other system components.

Telephone 102 is one or more wired and/or wireless telecommunications devices. Telephone 102 exchanges telecommunications signals over conventional residential telephone paths and communications network 180. In an embodiment, telephone 102 implements a voice over Internet Protocol (VoIP) to exchange voice communications over a computer network (such as the global Internet), and makes the voice signals available to communications network 180. In an embodiment, telephone 102 includes facsimile functions.

Positioning unit 104 designates spatial locations within the residence that serves as the hosting environment for system 100. Positioning unit 104 is coupled to the other system components (e.g., control server 114) via a wired and/or wireless interface. Positioning unit 104 is operable to designate a floor or room within the residence. Positioning unit 104 is also operable to designate a specific location within a floor or room. Moreover, positioning unit 104 can be situated outside of the residence to thereby, designate external areas of the residence. In an embodiment, positioning unit 104 is coupled to another system component. In another embodiment, multiple positioning units 104 are distributed throughout the residence. For example, the positioning units 104 can be located within, or mounted to, a wall, door, ceiling, floor, etc.

Computer client 106 includes a wired and/or wireless personal computer, personal digital assistant (PDA), enhanced telephone, personal television, or other data processing device linked to communications network 180. As a personal computer, computer client 106 can be a desktop, notebook, notepad, or the like. A display is coupled to computer client 106 to provide a text or graphical user interface (GUI) and enable a user to interactively communicate with control server 114. Input devices for computer client 106 include a keyboard, mouse, verbal command interface, mouse wheel, joystick, rudder pedals, touch screen, microphone, joystick, stylus, light pen, or any other type of peripheral unit.

Camera 108 is one or more video cameras, camcorders, or the like. The present invention contemplates both wired and wireless devices. Camera 108 can be a part of home security or monitoring system, such as a baby monitor, etc. In an embodiment, camera 108 includes a control unit that enables remote control of various camera functions, such as pan, tilt, zoom, focus, iris control, etc.

Controller client 110 is a wired and/or wireless data processing device that enables a user to interact and send control messages to control server 114 and the other system components. Controller client 110 can be a portable or non-portable version of the devices listed as computer client 106. For example, computer client 106 can be a personal notebook or notepad computer, PDA, enhanced telephone, or other device linked to communications network 180 and including a display with the ability to interact with the other system components. Hence, controller client 110 enables a user to remotely control the operations of various components of system 100. In an embodiment, the display for controller client 110 is capable of receiving video and/or audio from the other system components. In an embodiment, controller client 110 includes a flash ROM that enables wireless downloads and/or uploads.

Television 112 is a conventional television. In an embodiment, television 112 is enhanced to support interactive and/or personal services. Personal services include virtual recording, programming, pausing/rewinding live broadcasts, or the like. For example, television 112 can be a personal television enhanced to support the MSN® TV service, hosted by WebTV Networks, Inc. (Mountain View, Calif.), that supports WebTV® available from Microsoft Corporation (Redmond, Wash.). In an embodiment, television 112 includes a set-top box for cable and/or satellite receptions. In an embodiment, television 112 is connected to a PVR, VCR, or DVD player.

Monitor 116 is a wired or wireless display that supports closed-circuit viewing. In an embodiment, monitor 116 is a flat LCD positioned on a wall, standing on a desk, table, or counter top, situated near the side of pool or hot tub, etc. In an embodiment, monitor 116 receives a streaming screen saver that displays static or dynamic images of a photograph, portrait, etc. when monitor 116 is functioning in an inactive state. In an embodiment, monitor 116 receives feeds from a television, stereo, or security/monitoring system (e.g., a baby monitor), etc., when monitor 116 is in an active state.

Audio client 118 is a wired or wireless audio system, such as a stereo, audio server, CD/record/cassette player, MP3 player, etc. Audio client 118 can be a microphone as part of a security/monitoring system, such as a baby monitor. In an embodiment, audio client 118 is one or more speakers or like audio outputs located throughout the residence. In another embodiment, audio client 118 is an intercom system, public announcement system, door answering service, or the like.

Residential appliance 120 is one or more residential appliances, such as, but not limited to, a refrigerator, stove, microwave, toaster, coffee-maker, alarm clock, thermostats, humidifiers, sprinkler system, lighting, light dimmers, etc. In an embodiment, control server 114 and/or controller client 110 controls the operations and/or functions of one or more residential appliances 120, such as on/off, timers, modulation (e.g., oven temperatures, etc.), pause, snooze, etc.

The aforementioned system components are not intended to be exhaustive. Other devices (including appliances), applications, and/or the like can be implemented and are deemed to be within the scope of the present invention.

As discussed, communications network 180 provides a transmission medium for communicating among the system components. In embodiments, control server 114 polices all traffic among the other system components. As such, the exchange of information among the system components is routed or otherwise controlled via control server 114. In another embodiment, communications network 180 supports peer-to-peer communications. As such, the system components exchange audio, video, other data, and/or control messages directly with each other and without being policed by control server 114.

Communications network 180 is a wired and/or wireless local area network (LAN). Thus, communications network 180 includes wired, wireless, or both transmission media, including satellite, terrestrial (e.g., fiber optic, copper, UTP, STP, coaxial, hybrid fiber-coaxial (HFC), or the like), radio, microwave, free-space optics, and/or any other form or method of transmission.

In an embodiment using a wired transmission medium, communications network 180 is an Ethernet LAN capable of supporting one hundred Mbps to one Gbps. In an embodiment, a CAT-5 cable, or the like, is coupled to control server 114 and is distributed to a location within each room. In an embodiment, the cable is distributed to each system component, such as television 112, monitor 116, etc. The system component includes an audio/video (AV) connector that is responsive to receive the cable.

In an embodiment using a wireless transmission medium, communications network 180 supports the IEEE standard 802.11(a) which specifies a wireless Ethernet protocol for large-sized video. Using this protocol, communications network 180 can handle up to fifty-four Mbps with an effective range of ninety feet.

In another wireless embodiment, communications network 180 supports the IEEE standard 802.11(b) which specifies a wireless Ethernet protocol for small-size video. With this wireless protocol, communications network 180 is effective for ranges approximating 150-300 feet, and capable of supporting a nominal bandwidth of eleven Mbps, with 4-5 Mbps effective bandwidth. In another embodiment, the Bluetooth™ wireless technology (developed by Bluetooth SIG, Inc.) is used to support short-range wireless interfaces with system 100.

In an embodiment, communications network 180 includes a telephone line and/or powerline. In an embodiment, communications network 180 enables conventional electrical outlets and wiring to interconnect the system components and enable them to communicate with each other. In an embodiment, communications network 180 includes communications technologies made available from the Home Phone Networking Alliance (HomePNA) or the like HomePNA technologies enable the operation of telephone services and home networking, including, but not limited to, video conferencing, video security, VoIP telephony, digital video networking, internet sharing, and multi-user gaming.

III. Control Server and Archive

Control server 114 is one or more servers, with each server being one or more computers providing various shared resources with each other and to other system components. The shared resources include files for programs, web pages, databases and libraries; output devices, such as, printers, plotters, display monitors and facsimile machines; communications devices, such as modems and Internet access facilities; and other peripherals such as scanners, etc. The communications devices can support wired or wireless communications, including satellite, terrestrial (fiber optic, copper, coaxial, and the like), radio, microwave, free-space optics, and/or any other form or method of transmission.

In an embodiment, control server 114 is configured to support the standard Internet Protocol (IP) developed to govern communications over public and private Internet backbones. The protocol is defined in Internet Standard (STD) 5, Request for Comments (RFC) 791 (Internet Architecture Board). Control server 114 also supports transport protocols, such as, Transmission Control Protocol (TCP), User Datagram Protocol (UDP), Real Time Transport Protocol (RTP), or Resource Reservation Protocol (RSVP). The transport protocols support various types of data transmission standards, such as File Transfer Protocol (FTP), Hypertext Transfer Protocol (HTTP), Simple Network Management Protocol (SNMP), Network Time Protocol (NTP), or the like.

In an embodiment, control server 114 is configured to support various operating systems, such as, the Netware™ operating system available from Novell, Inc. (Provo, Utah); the MS-DOS® and Windows® operating systems available from Microsoft Corporation; the Linux® operating system available from Linux Online Inc. (Laurel, Md.); the Solaris™ operating system available from Sun Microsystems, Inc. (Palo Alto, Calif.); or the like as would be apparent to one skilled in the relevant art(s).

Control server 114 is operable to query, receive, and/or write to various archival and/or retrieval components. The archival and/or retrieval components can be internal and/or external to control server 114. For example, control server 114 is configured to receive compressed streams, filter the streams for metadata (such as, date, time, source, etc.), and store the streams and metadata for future retrieval.

Figure 2:
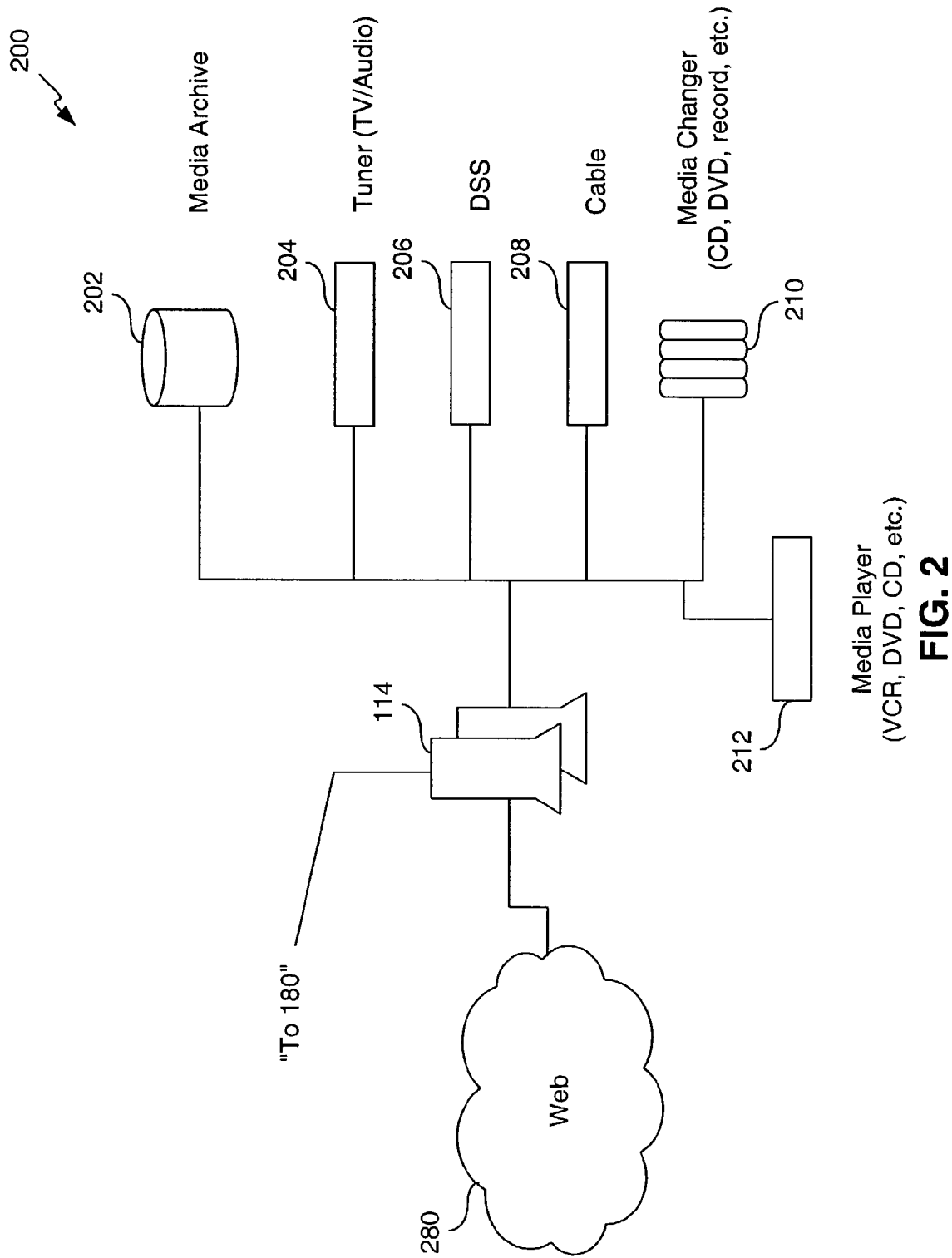
FIG. 2 illustrates a control server with archival and/or retrieval components according to an embodiment of the present invention.

FIG. 2 shows control server 114 connected to various archival and/or retrieval (A/R) components according to an embodiment of the present invention. The A/R components include a media archive 202, a tuner 204, a DSS box 206, a cable box 208, a media changer 210, and a media player 212. The aforementioned archival and/or retrieval components are not intended to be an exhaustive listing. Other archival and/or retrieval components can be implemented and are deemed to be within the scope of the present invention.

The archival and/or retrieval components can be centrally located (as shown in FIG. 2), widely distributed throughout the residence, or accessible from an external source (such as, a web server communicating over the global Internet) via a network connection 280. Network connection 280 include a wired and/or wireless LAN or wide area network (WAN), such as an organization's intranet, a local internet, the global-based Internet (including the World Wide Web (WWW)), an extranet, a virtual private network, licensed wireless telecommunications spectrum for digital cell (including CDMA, TDMA, GSM, EDGE, GPRS, CDMA2000, WCDMA FDD and/or TDD or TD-SCDMA technologies), or the like. Network connection 280 includes wired, wireless, or both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

Media archive 202 provides one or more storage mediums for various data (including video and audio) and metadata. In embodiments, media archive 202 includes a removable storage unit (e.g., floppy disk, CD-ROM, etc.), as described in greater detail below. To support larger volumes of content, one or more integrated databases or a data warehouse system is used to store the content and support control server 114, as described herein.

In embodiments, media archive 202 includes a relational or object oriented (OO)/component based database management system, or the like, that controls the storing, retrieving, and updating of data and metadata in the database records. The database management system also controls data integration, enforces integrity rules and constraints (including data integrity and referential integrity), and enforces security constraints.

In embodiments, media archive 202 is a scalable system that stores data on multiple disk arrays. Data warehousing can be implemented with the SQL Server 2000 application available from Microsoft Corporation, the Oracle 9i™ database available from Oracle Corporation (Redwood City, Calif.), or the like. In embodiments, media archive 202 supports Open DataBase Connectivity (ODBC) or Java DataBase Connectivity (JDBC) protocols.

In embodiments, media archive 202 is an index file database system or a plan file database system, such as the Berkeley DB database resources available from Sleepycat Software, Inc. (Lincoln, Mass.).

Tuner 204 receives audio and/or video signals from television and/or radio broadcasts. Tuner 204 is one or more individual radio and/or television tuners. In an embodiment, tuner 204 is configured to receive NTSC/PAL television signals.

DSS box 206 receives audio and/or video broadcast signals from a satellite receiver. Cable box 204 receives audio and/or video broadcasts and pay-for-view unicasts over a copper, UTP, STP, coaxial, optic or HFC interface.

In addition to receiving broadcast signals, control server 114 is also configurable to support recording capabilities. As discussed, broadcast can be recorded to media archive 202. However, control server 114 includes one or more record/playback applications or devices, namely media player 212 and media changer 210. Media player 212 can be a VCR player, DVD player, PVR, video server, virtual recorder, audio server, stereo, CD player, record player, audio tape or cassette player, digital audio tape recorder, and/or any other device or application that stores, records, generates, or plays back via magnetic, optical, electronic, or any other storage media. The recordings can be indexed by album, song, artist, genres, or the like.

Media changer 210 records and plays media and/or multimedia similar to media player 212. However, media changer 210 is capable of loading multiple recordings (e.g., CD, DVD, etc.) to be played without having to be reloaded. For example, media changer 210 can be a jukebox or like device that enables a user to load all available CDs, for example, at once.

IV. Managing System Functions

Control server 114 provides centralized command and control of various functions within a controlled environment, such as system 100. The functions managed by control server 114 includes video serving, audio serving, telephony, messaging, file sharing, Internet access, and security. According to embodiments of the present invention, a user operates controller client 110 to establish or re-configure these functions and/or receive media from control server 114 or other system components (either directly from the other system components or indirectly from the system components via control server 114).

Figure 3:
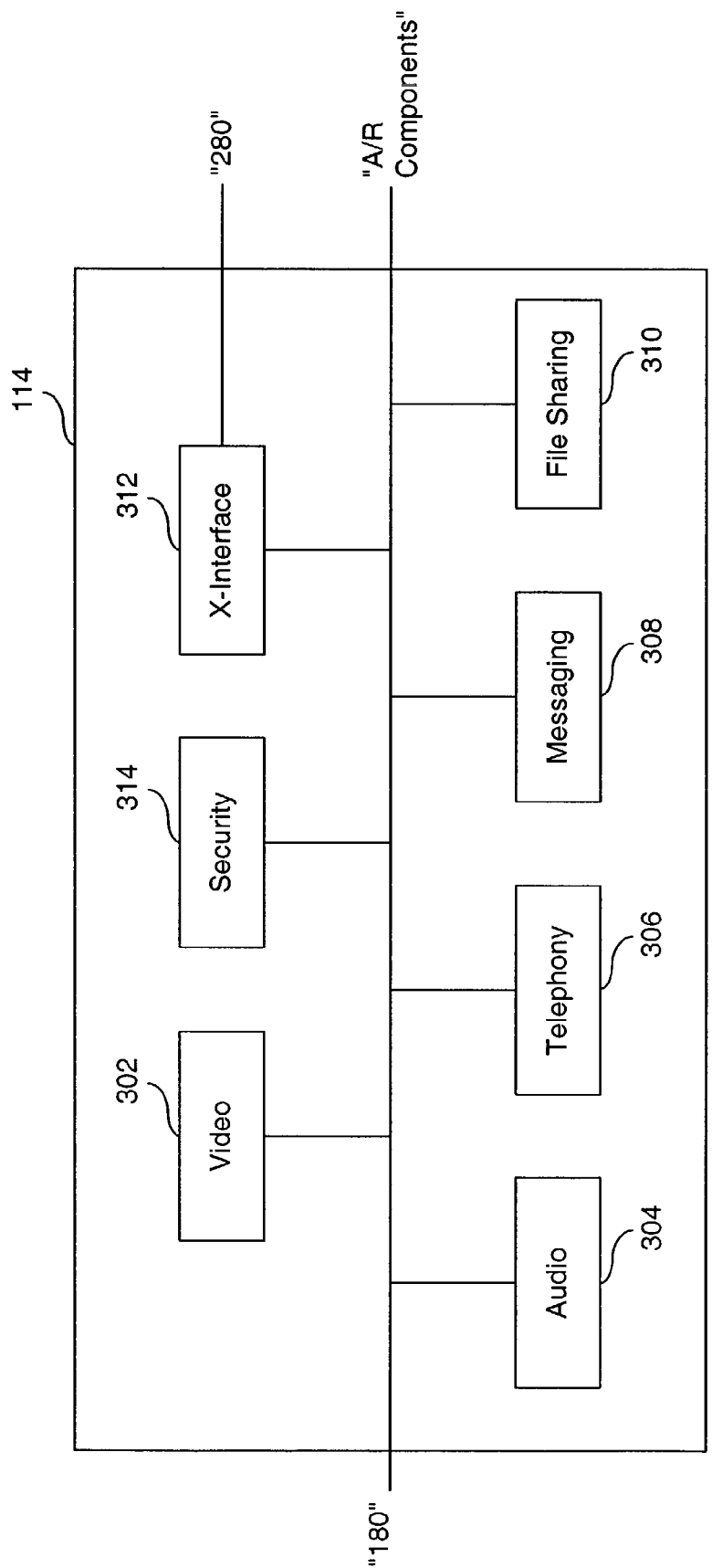
FIG. 3 illustrates a control server according to an embodiment of the present invention.

FIG. 3 illustrates an embodiment of control server 114. Control server 114 includes various controller modules for managing various system functions. As shown, control server 114 includes a video controller 302, an audio controller 304, a telephony controller 306, a messaging controller 308, a file sharing controller 310, an external network interface (x-interface) controller 312, and a security controller 314. The controller modules are enabled to exchange signals with other system components via communications network. The controller modules are also enabled to exchange communications with other A/R components. As described with reference with FIG. 2, the A/R components include media archive 202, tuner 204, DSS box 206, cable box 208, media changer 210, media player 212, and/or the like.

Video controller 302 manages the exchange of video signals within system 100. Video controller 302 receives and/or distributes video signals for displays coupled to, for example, computer client 106, television 112, monitor 116, controller client 110, etc. Video controller 302 also interacts with the A/R components, such as, media archive 202, tuner 204, DSS box 206, cable box 208, media changer 210, media player 212, network connection 280, etc. In embodiments, video controller 302 reads and/or writes to an internal storage medium that is designated for video, and that is in addition to, or in lieu of, the A/R components of the present invention.

Accordingly, video controller 302 receives video signals from the A/R components (and/or its internal storage medium) and distributes them to other system components (e.g., television 112, controller client 110, etc.). Video controller 302 can also receive a video stream from a source (e.g., network connection 280, television 112, media archive 202, etc.) and store the stream in one of the A/R components (e.g., media archive 202, media player 212, etc.), and/or its internal storage medium, for future viewing. For example, video controller 302 can query a web site (e.g., "www.mtv.com") to download a music video to be played and/or stored to a system component. To enable distribution over communications network 180, video controller 302 provides MPEG encoding on the fly according to embodiments of the present invention. In other words, video controller 302 is able to receive, encode, and distribute a media stream in real time or near term. In embodiments, network connection 280 enables video controller 302, or like components, to implement broadband internet access for audio/video distribution.

Another controller module is audio controller 304. Audio controller 304 manages the exchange of audio signals within system 100. Accordingly, audio controller 304 receives and/or distributes audio signals for one or more audio components, such as, for example, audio client 118 or speakers coupled to, for example, computer client 106, television 112, monitor 116, controller client 110, etc. Audio controller 304 also interacts with the A/R components (e.g., tuner 204, DSS box 206, cable box 208, media changer 210, media player 212, network connection 280, etc.) to receive audio signals from the A/R components and distribute them to other system components (e.g., audio client 118, controller client 110, etc.). Additionally, audio controller 304 can receive an audio stream from a source (e.g., network connection 280, television 112, media archive 202, etc.) and store the stream in one of the A/R components (e.g., media archive 202, media player 212, etc.) for future recall. In embodiments, audio controller 304 reads and/or writes to an internal storage medium that is designated for audio, and hence distributes audio to and from its internal storage medium. For example, audio controller 304 can query a web site (e.g., "MP3.com") to download a digital recording to be played and/or stored to a system component. In an embodiment, audio controller 304 encodes the audio stream to MPEG-3 format to produce near-CD quality in real time or near time. In another embodiment, audio controller 304 encodes the audio stream to produce CD quality audio in real time or near term.

Telephony controller 306 is another controller module within control server 114. Telephony controller 306 manages the distribution of telecommunications from conventional telephone paths and/or computer networks (e.g., communications network 180, network connection 280, etc.). In an embodiment, telephone 102 is coupled to a conventional wired or wireless telephone path (not shown), such as POTS or PSTN. Telephone 102 can also be coupled to a cellular or satellite communications path (not shown). A dedicated interface (not shown) is provided to enable the cellular/satellite telephone 102 to interact with system 100. Calls received or transmitted over the conventional path are also monitored and/or controlled by control server 114. As such, control server 114 is responsive to distributing signals from the calls to other system components. For example, controller client 110 is one potential recipient component. Hence, a user is able to directly operate controller client 110 to place and/or receive calls indirectly via telephone 102.

In another embodiment, telephone 102 is coupled to a computer network. Alternatively, a wired or wireless telephone (not shown) that is coupled to computer client 106 is capable of interacting with a computer network. The computer network is a LAN or WAN (such as the Internet) that is accessed via communications network 108 or network connection 208, or the system components (i.e., telephone 102, computer client 106) can have a dedicated link to a computer network, such that the link is independent of communications network 108. In an embodiment, the telecommunications signals are formatted for VoIP or the like. Irrespective of the source of the computer network, the telecommunications signals from the computer network are monitored and/or controlled by control server 114. As discussed with reference to conventional telecommunications calls, control server 114 is responsive to distributing signals from the calls to other system components, such as, for example, controller client 110.

In addition to answering, placing, and/or distributing telecommunications calls, control server 114 is operable to perform other telephony functions. In an embodiment, control server 114 supports speed dialing. Telephone numbers are stored in a memory (such as one of the A/R components described with reference to FIG. 2) coupled to residential control server 114. In another embodiment, control server 114 is programmable to implement service blocking. A user is able to create a profile to block telephone calls from a designated number or family or numbers (e.g., 900 calls, etc.). In yet another embodiment, control server 114 logs inbound/outbound calls and/or enable redialing of past and/or missed calls.

Control server 114 also includes messaging controller 308. Messaging controller 308 enables centralized storage of telephone calls received via telephony controller 306 and the like. Voice messages are written to a memory (such as one of the A/R components described with reference to FIG. 2) coupled to control server 114. Messaging controller 308 also permits messages (including audio, video, and/or text) to be created, stored, and/or retrieved within system 100. In other words, a user can operate one of the system components (e.g., controller client 110, telephone 102, audio client 118, etc.) to create a message for the same or another user. The message can be a "to-do" list, baby-sitting instructions, grocery list, etc. Messaging controller 308 also enables control server 114 to interact with computer client 106 or other system components to search and/or retrieve data from computer emails, instant messaging services, and/or notes, tasks, reminders, and/or events from personal calendars.

Control server 114 also includes file sharing controller 310. File sharing controller 310 enables control server 114 to function as a central file server for all personal computers in communications with system 100. File sharing controller 310 permits files to be stored and accessed by system components located within the residence that is hosting system 100. However, in an embodiment, devices located outside of system 100 is able to store and/or retrieve files via file sharing controller 310. For example, if a static IP address is sustained by the ISP for system 100, a remote user could log into control server 114 to retrieve and/or store files via file sharing controller 310.

X-interface controller 312 is another controller module of control server 114. X-interface controller 312 manages access to the system components from external devices and/or applications, and/or access to external devices, applications, and/or web sites from the system components. As such, x-interface controller 312 provides a gateway to external networks, such as the global Internet, other private WANs, or the like. In an embodiment, x-interface controller 312 supports web proxies and is configurable to block designated web sites in toto or per user. In another embodiment, x-interface controller is operable to track and/or record access/visits to web sites from other system components.

X-interface controller 312 supports wired and/or wireless access to external networks, including cable and/or satellite ISPs. In an embodiment, x-interface controller 312 permits control server 114 to operate as a web server, provided the ISP is able to provide a static IP address.

Security controller 314 enables control server 114 to interact with and/or manage various security systems, including the communications security protocols for system 100. In an embodiment, security controller 314 controls and/or monitors feedback from system components that form a part of a security system. For example, video (e.g., camera 108, etc.) and audio (audio client 118, camera 108, etc.) can be captured and served to controller client 110 or monitor 116. Motion sensors can also be placed within the residence or in external locations surrounding the residence. Feedback from the motion sensors can also be transmitted to security controller 314. In an embodiment, such feedback activates cameras 108 and/or audio clients 118 within the vicinity. In another embodiment, such feedback activates an alarm or signals the user of controller client 110. To signal the user, controller client 110 can vibrate, ring, flash a message, or the like. Control systems coupled to camera 108 permit security controller 314 to move and/or focus camera 108. In an embodiment, security controller 314 is operable to lock or unlock doors, windows, or entryways in response to user input.

In an embodiment, security controller 314 interfaces with fire and safety control system. As such, sensors feed into control server 114 and permit system 100 or a user to monitor emergency situations. Alarms, sprinkler systems, and the like can be operated via control server 114 and/or controller client 110.

In addition to home access and fire and safety systems, security controller 314 also interacts with personal asset security systems, such as safes, file cabinets, rooms, drawers, and the like. Security profiles can be created and maintained to permit selected individuals to access secured areas. Passwords, biometrics, and/or the like can be stored and authenticated to permit access.

Security controller 314 also permits profiles to be established and maintained to monitor and/or restrict access to web sites, telephone numbers, television channels, CDs, videocassettes, or the like. In an embodiment, user profiles are established to permit remote access to the system components from externally located devices and/or applications. For example, an external user can be authorized via security controller 314 to log into control server 114 over the Internet from a remote location and receive live feeds from camera 108, archived feeds from camera 108, broadcasts from television 112, messages stored via messaging controller 308, files stored via file sharing controller 310, or the like. For instance, parents could access control server 114 to monitor their home and/or their children or babysitter while away on vacation or at work.

V. Location Awareness

In embodiments of the present invention, network control system 100 tracks and/or monitors the positions of various system components (herein referred to as the "target components") in real time or near term. As a user migrates within the controlled environment that hosts system 100, the present invention can implement several protocols to enable system 100 to determine a location of a target component and hence, the location of the user in communications with the target component. In an embodiment, a control center (e.g., control server 114, a local processor coupled to the target component, etc.) determines the current location of the target component (e.g., controller client 110, etc.), and sends instructions to reconfigure the target component to control other system components within a specified vicinity. For example, if controller client 110 is determined to be located within a dining area, control server 114 enables controller client 110 to be capable of controlling system components positioned in the dining area. Such components can include light dimmers, audio systems, heating units for food servers, or the like.

Positioning devices are utilized in several embodiments for tracking and/or monitoring target components. As described above with reference to FIG. 1, one or more positioning units 104 are distributed throughout the controlled environment that hosts system 100. The positioning units 104 can be coupled to a target component (e.g., controller client 110, audio client 118, telephone 102, etc.), or located as a stand-alone device within the controlled environment.

In an embodiment, positioning unit 104 is part of a RF communications system. As such, a RF transponder interacts with a RF interrogator to communicate positioning information. The transponder is coupled to a system component and makes available identification information that uniquely identifies the system component. The transponder can make available other types of information, including an assigned location of the system component if the component is a stationary or infrequently moved device. Therefore, as described in further detail below, the transponder can be coupled to either the target component or a positioning component (e.g., positioning unit 104).

The transponder can be active or passive. An active transponder transmits a continuous or periodic signal containing the identification information. A passive transponder remains inactive and/or silent until it is activated by, for example, an interrogator, or manually activated by a user. Therefore, the system component (that includes the transponder) can operate in a silent mode or active mode. In active mode, the position of the system component (i.e., the target component) is being tracked and/or monitored in real time or near term. In silent mode, the current position of the system component (i.e., the target component) is not known to system 100 with absolute certainty until the transponder is activated.

The interrogator is coupled to another system component and receives positioning information (e.g., identification information or the like) when it comes within the communications range of a transponder. The interrogator will automatically receive the positioning information from an active transponder, or will activate a passive transponder to receive the positioning information.

The interaction between a transponder and an interrogator can be explained with reference to FIG. 4A and FIG. 4B. FIG. 4A illustrates an embodiment for positioning system components within system 100. As shown, a transponder 404 is coupled to controller client 110, and an interrogator 406 is coupled to or embodied within positioning unit 104. As such, as a user 402 carrying controller client 110 enters the vicinity of positioning unit 104 (i.e., interrogator 406), positioning unit 104 receives identification codes from controller client 110. The identification codes include an identifier for the transmitting controller client 110, or the like. In an embodiment, positioning unit 104 sends the identification codes to residential control server 114 (described with reference to FIG. 1) for further processing. Positioning unit 104 can also send other identification codes or information with the identifier for the polled controller client 110. In an embodiment, positioning unit 104 sends a vicinity identifier, or the like, for the region (e.g., floor, room, etc.) of the residential environment where positioning unit 104 is located. In another embodiment, control server 114 determines the vicinity identifier from an identifier for the positioning unit 104. Controller client 110 has been described by way of example. Other system components can also be coupled with transponder 404 and, thereby, configured to have their locations determined by embodiments of the present invention.

Figure 4B:
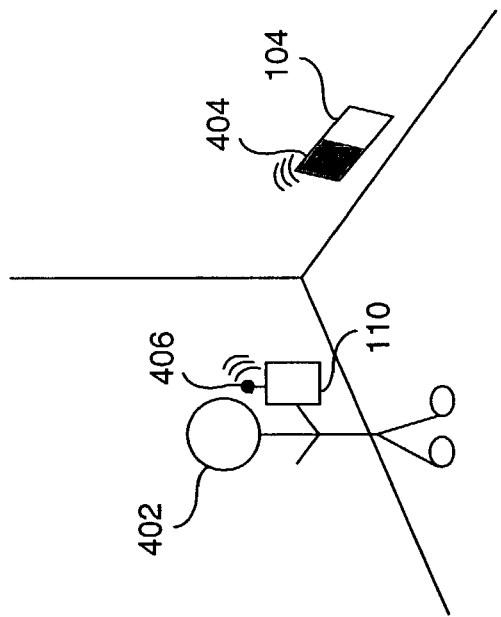
FIG. 4B illustrates a positioning mechanism for a control system according to another embodiment of the present invention
Figure 4A:
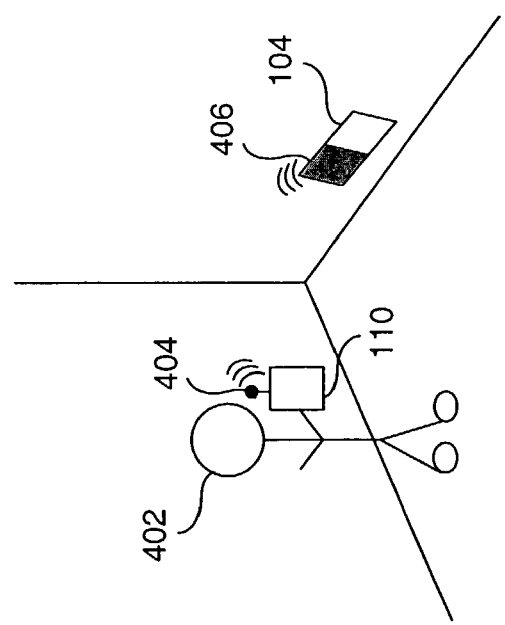
FIG. 4A illustrates a positioning mechanism for a control system according to an embodiment of the present invention.

FIG. 4B illustrates another embodiment for positioning a system component within system 100. As shown, transponder 404 is coupled to or embodied within positioning unit 104. Interrogator 406 is coupled to controller client 110. Therefore as user 402 carrying controller client 110 enters the vicinity of positioning unit 104 (i.e., transponder 404), controller client 110 receives identification codes from positioning unit 104. The identification codes include an identifier for the transmitting positioning device 104, a vicinity identifier for the region (e.g., floor, room, etc.) of the controlled environment, or the like. In an embodiment, controller client 110 processes the identification code to determine its location and/or sends the identification code to control server 114 for archival purposes. In another embodiment, controller client 110 sends the identification code to control server 114 (described with reference to FIG. 1) to determine its location and for further processing. Again, controller client 110 has been described by way of example. Other system components can also be coupled with an interrogator 406 and, thereby, configured to have their locations determined by embodiments of the present invention.

In an embodiment, transponder 404 is an electronic tag, beacon, controller, or the like. The electronic tag is characterized as having any shape or size, and is located on, or integrated within, the system component. The electronic tag includes a microprocessor connected to communications circuitry that supports RF communications with other devices. The microprocessor is coupled to a memory for storing information (i.e., identification information) and transceiver for exchanging information with the other devices.

In an embodiment, transponder 404 has a dedicated microprocessor for transmitting positioning information. In another embodiment, transponder 404 utilizes or shares the microprocessor for the hosting system component (e.g., controller client 110) to exchange positioning information. For example, the hosting system component would include an infrared port that is coupled to a microprocessor and memory located in the system component. The memory includes the identification information and related data. The microprocessor interacts with the memory and infrared port to support exchanges with interrogator 406. As such, the interaction among the microprocessor, memory and infrared port serves as transponder 404.

Wireless communications between transponder 404 and interrogator 406 are supported by various technologies. In an embodiment, the Bluetooth™ wireless technology (developed by Bluetooth SIG, Inc.) is used to implement a short-range wireless interface between transponder 404 and interrogator 406.

In lieu of, or in addition to RF communications, positioning unit 104, in an embodiment, is part of a data collection system using bar codes. In other words, a bar code is disposed to a system component and stores identification information that uniquely identifies the system component. As described with reference to a transponder, the bar code can store other types of information, including the assigned location of the system component if the component is a stationary device. A bar code scanner collects the identification information so that the information can be processed to determine the location of the system component.

Bar code data collection can also be described with reference to FIG. 4A and FIG. 4B. In other words, interrogator 406 is a bar code scanner and transponder 404 is a bar code according to embodiments of the present invention. Referring back to FIG. 4A, a bar code 404 is disposed to controller client 110 and a bar code scanner 406 is disposed to or embodied within positioning unit 104. As user 402 carrying controller client 110 enters the vicinity of positioning unit 104 (i.e., bar code scanner 406), positioning unit 104 receives the identification codes containing an identifier for the controller client 110. As described above with reference to an interrogator, the identification codes, with or without a vicinity identifier, are sent to control server 114 (described with reference to FIG. 1) for further processing. Although controller client 110 has been described by way of example, other system components can also be coupled with a bar code 404 and, thereby, configured to have their locations determined by embodiments of the present invention.

Referring back to FIG. 4B, another embodiment for positioning system components with bar coding is illustrated. As shown, bar code 404 is disposed to or embodied within positioning unit 104, and a bar code scanner 406 is disposed to controller client 110. As user 402 carrying controller client 110 enters the vicinity of positioning unit 104 (i.e., bar code 404), controller client 110 receives the identification codes containing an identifier for the transmitting positioning unit 104. As described above with reference to a transponder, the identification codes, in an embodiment, includes an identifier for the transmitting positioning device 104, a vicinity identifier for the region of the residential environment, or the like. The identification codes, with or without a vicinity identifier, are processed by controller client 110 to determine its location, and/or sent to control server 114 (described with reference to FIG. 1) for further processing. Although controller client 110 has been described by way of example, other system components can also be coupled with a bar code scanner 406 and, thereby, configured to have their locations determined by embodiments of the present invention.

The utilization of RF and bar coding technologies represent alternative methodologies for tracking and/or monitoring the location of system components. As would be apparent to one skilled in the relevant art(s), other positioning technologies can also be implemented with the present invention. For example in larger scaled environments, the use of GPS receivers, cellular signals, triangulation, or the like are available alternatives.

In another embodiment, positioning can be realized without the use of positioning unit 104. Controller client 110, or the like, is responsive to receive and process commands from the user operating controller client 110. The commands are manually and/or verbally entered into controller client 110. Controller client 110 processes the commands, or sends the commands to control server 114, to determine the location. For example, the user can specify the location "living room," and the controller client 110 would be profiled to control devices in the living room.

In another embodiment, however, voice and/or manual commands can be entered into positioning unit 104 or the like. The user would also enter an identifier for the target component (e.g., controller client 110), and position unit 104 would send control signals to control server 114, or the like, to update the location records of target component.

Figure 5:
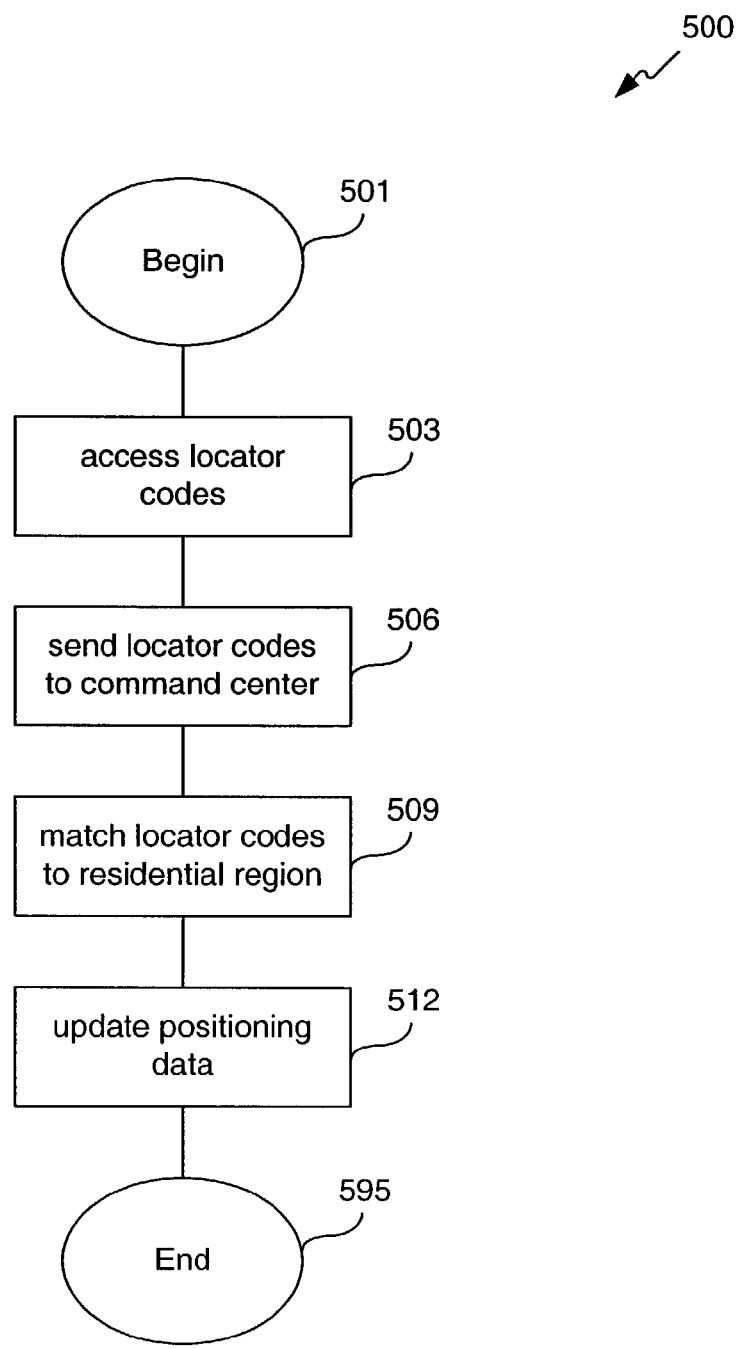
FIG. 5 illustrates a flow diagram for tracking and/or monitoring system components according to an embodiment of the present invention.

As described above, the present invention supports various protocols for gathering location information. The present invention provides several methods and/or techniques for processing the location information to track and/or monitor the position or movement of various components of system 100. Referring to FIG. 5, flowchart 500 represents the general operational flow of an embodiment of the present invention. More specifically, flowchart 500 shows an example of a control flow for tracking and/or monitoring system components within a controlled environment.

Referring to FIG. 5, the control flow of flowchart 500 begins at step 501 and passes immediately to step 503. At step 503, an appropriate component of system 100 accesses locator codes that correspond to a system component (i.e., target component) that is being tracked and/or monitored. Referring back to FIG. 1 and FIG. 2, the present invention can determine the current position of any of the aforementioned system components, including, but not limited to, telephone 102, positioning unit 104, computer client 106, camera 108, controller client 110, television 112, control server 114, monitor 116, audio client 118, residential appliance 120, media archive 202, tuner 204, DSS box 206, cable box 208, media changer 210, media player 212, and/or other devices and/or applications.

As described above, the present invention includes various embodiments for accessing locator codes (or a vicinity identifier as described above). For instance, in an embodiment, a user interacts with a text or graphical interface to manually enter the current location for a target component. In another embodiment, a voice command interface enables the user to enter voice commands for a target component. As such, the user verbally communicates the current location.

In an embodiment, a target component interacts with positioning unit 104 to access locator codes. Referring back to FIG. 4B, the target component (e.g., controller client 110, etc.) is coupled to interrogator 406. Interrogator 406 polls positioning unit 104 for a vicinity identifier. The vicinity identifier includes locator codes for the current location for both system components.

Referring back to FIG. 4A, interrogator 406 is integrated with positioning unit 104. Hence, a target component (e.g., controller client 110, etc.) is polled by interrogator 406. As a result, interrogator 406 receives an identifier for the polled target component. Locator codes are produced by associating the identifier with the vicinity identifier for interrogator 406.

Referring back to FIG. 5 at step 506, the locator codes are sent to a command center for further positioning processing. In an embodiment, the command center is control server 114. In another embodiment, the command center is at the target component (e.g., controller client 110, computer client 106, etc.).

At step 509, the locator codes are matched to a region. The region can be a specific floor, hallway, corridor, balcony, room, or the like. The region can be a specific area within a floor, hallway, corridor, balcony, room, or the like. The region can also be a specific area within an external perimeter of the residence hosting system 100, or an adjoining or free-standing shelter on the residential grounds.

At step 512, the current region is communicated to the target component and/or stored in the records of control server 114 for future recall. After the system component has been positioned and its positioning data has been updated, the control flow ends as indicated at step 595.

Figure 6:
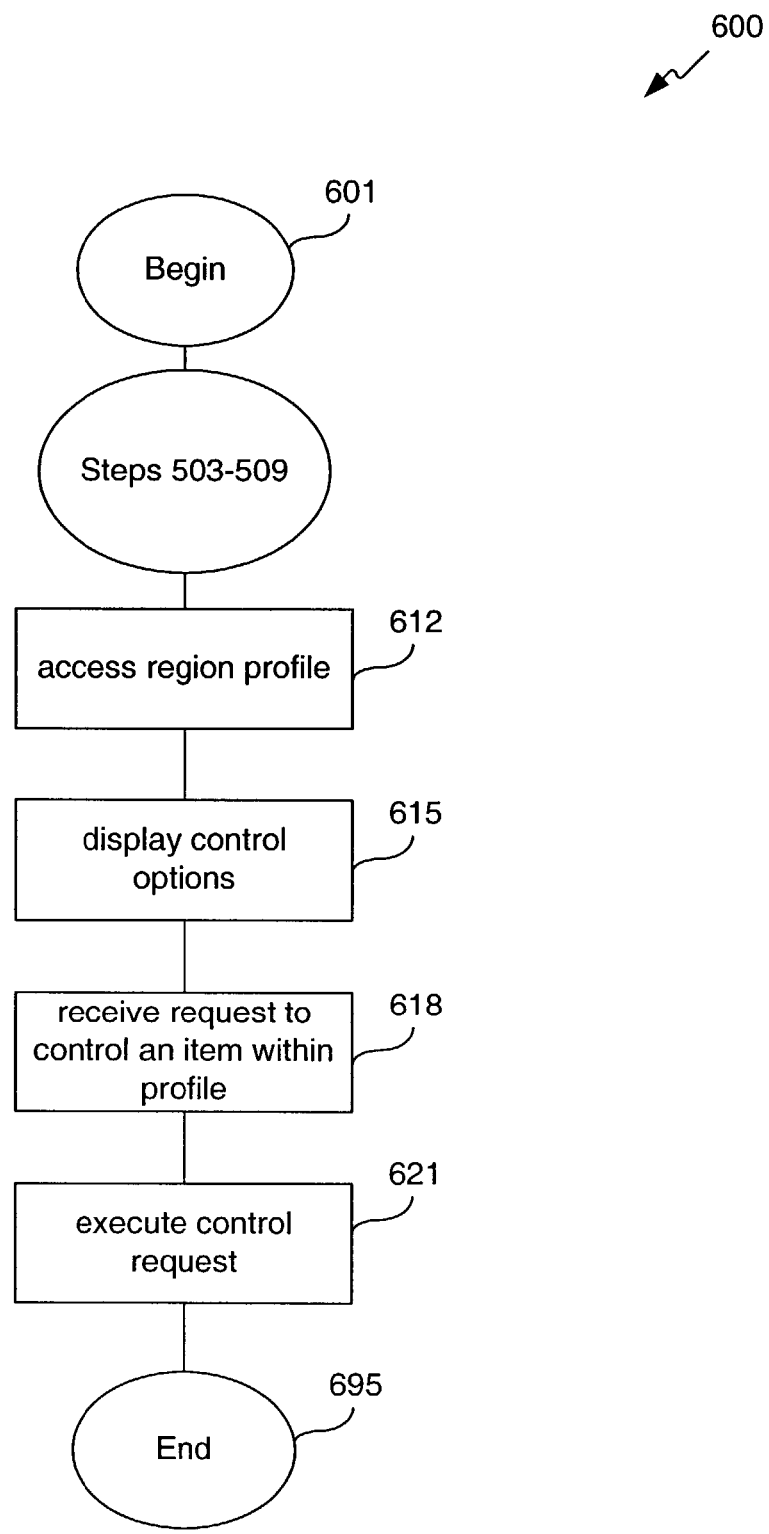
FIG. 6 illustrates a flow diagram for commanding and/or controlling system components in response to user location according to an embodiment of the present invention.

In an embodiment, the positioning information enables system 100 to command and/or control specific system components based on the current location of a user interacting with system 100. This can be described with reference to FIG. 6. Flowchart 600, as illustrated in FIG. 6, represents the general operational flow of an embodiment of the present invention. More specifically, flowchart 600 shows an example of a control flow for commanding and/or controlling system components based on a user's current location.

Referring to FIG. 6, the control flow of flowchart 600 begins at step 601 and passes immediately to steps 503-509. As described with reference to FIG. 5 at steps 503-509, locator codes enable system 100 to determine the current location or region of a user interacting with a target component (e.g., controller client 110).

At step 612, a region profile is accessed for the region. The region profile includes a listing of devices and/or applications (i.e., system components) that receive commands and/or controls from control server 114 and/or controller client 110.

At step 615, the region profile is processed to present control options for the user to review. The control options include the listing of devices and/or applications corresponding to the region profile. As described with reference to FIG. 5, the positioning can be determined remotely at control server 114 or locally at the target component (e.g., controller client 110). If determined remotely, control server 114, for example, produces and sends a user interface to display the control options on the target component (e.g., controller client 110 or another system component the user is operating). If determined locally, the target component (e.g., controller client 110, etc.) retrieves the region profile to produce the user interface. The region profile can be sent to the target component on demand, or the target component can be updated periodically with available region profiles.

At step 618, the user operates the target component (e.g., controller client 110, etc.) to send a request to control a system component (e.g., television 112, appliance 120, etc.) that is identified in the region profile. The user can send a request to control a function and/or an operation of a system component. The user can send a request to alter the configuration or security profile for the component. Other control request can be sent as would be apparent to one skilled in the relevant art(s).

At step 621, the control request is executed by the designated component. The control request can be transmitted directly to the designated component, or indirectly to the designated component via control server 114. After the control request has been executed, the control flow ends as indicated by step 695.

For example, if a user is operating controller client 110 and is determined by system 100 to be positioned in the "living room," controller client 110 would receive a user interface for controlling system components in the living room. One system component can include, for example, security monitor 116 that receives video input from camera 108 located at the front door to the residence. The user can interact with controller client 110 to pan, tilt, or focus camera 108 to display an image on monitor 116 of a visitor standing at the front door. Another system component can be television 112, and controller client 110 can receive a user interface for controlling the volume levels or channel selections for television 112. The user can also interact with controller client 110 to alter the settings of HVAC equipment (i.e., residential appliance 120)

Figure 7:
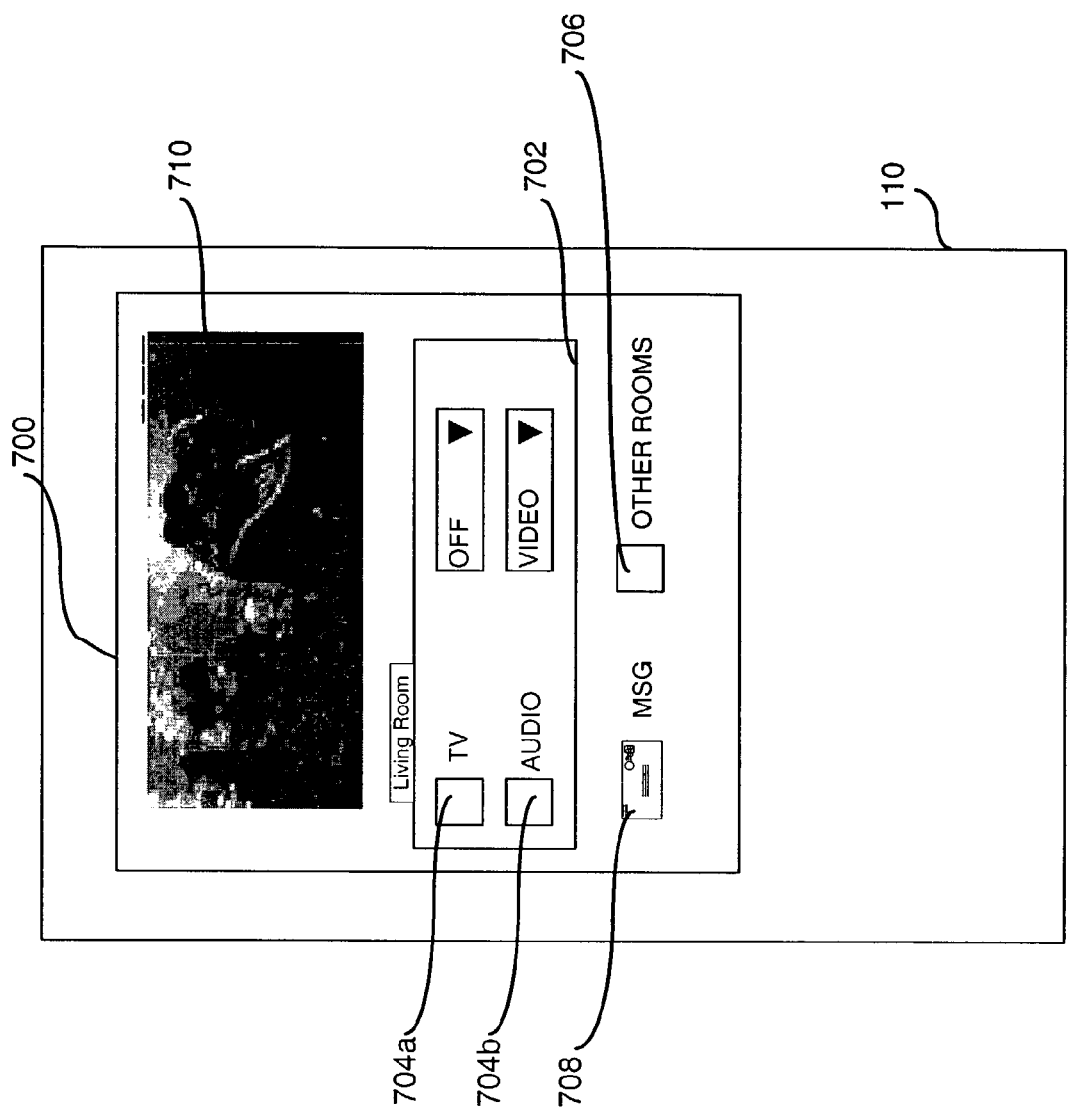
FIG. 7 illustrates user interface for presenting control options according to an embodiment of the present invention.

The present invention supports various text, graphical or verbal command interfaces for presenting the control options to a user. FIG. 7 illustrates an embodiment of a user interface 700 for presenting location-specific control options. User interface 700 is produced on controller client 110. However, as described herein, a user can operate any of the other system components to send control requests, provided the system component is configured to produce user interface 700 or the like.

User interface 700 includes a control options region 702. Control options region 702 identifies system components from a region profile for a designated region. In this example, the region is a living room. System components identified in the region profile for living room include television 112 and audio client 118. Component controls 704a-704b enable a user to send control requests to a corresponding system component. Component control 704a corresponds to television 112. Component control 704b corresponds to audio client 118. Additional component controls 704a-704b can be included to send control requests to other system components profiled for a particular region.

The region, specified by control options region 702, can be determined by the positioning embodiments described above, or the region can be user-specified regardless of the current location of the user of controller client 110. The region is user-specified by activating a region toggle 706.

Messaging toggle 708 enables the user to interact with messaging controller 308 described with reference to FIG. 3. Therefore, the user is able to check email, voice mails, intra-residential messages, or the like.

Media viewer 710 enables the user to view media from another system component. For example, the user can interact with component control 704a to view a television program that is currently being broadcast on television 112. The user can also interact with component control 704b to receive audio from audio client 118.

Although media viewer 710 is shown as a video or multimedia player, media viewer 710 also allows audio signals to be received without video. Media viewer 710 can also be a web browser, or software application for word processing, video games, or the like. Therefore, the user can interact with control options region 702 and region toggle 706 to receive text, audio, video, or media and/or multimedia from other system components from any location within the residential environment hosting system 100.

VI. Profiling Controller Client for Personalized Use

The present invention enables a user to operate controller client 110 to command and/or control other system components. In an embodiment, controller client 110 only permits the user to control system components within the vicinity of controller client 110. In another embodiment, controller client 110 provides the option of controlling system components in another region.

In embodiments, control of the various system components is based on preset profiles established for the user. The profiles can be generic for all users and/or specifically configured for a specific user. If configured for a specific user, the present invention utilizes various protocols to identify or authenticate a specific user and execute the profile established for the user. In an embodiment, a username and/or password is entered into a system component (e.g., controller client 110, etc.). The password can be expressed by a verbal command, text, object, pixel, or the like. In another embodiment, biometrics are collected by a system component. As such, retinal, iris, facial, palm, fingerprint, and/or voice recognition technologies, or the like are implemented to identify and/or authenticate a user. In another embodiment, a user card is read by a system component (e.g., controller client 110, etc.). Other user identification and/or authentication techniques can be used to identify and/or authenticate a user. The present invention permits the user to alter the profile, as appropriate. The identification and/or authentication techniques, described above, prevent other users from altering or deleting the user profile after it has been established.

In embodiments, the present invention enables a user to establish a profile to store a "favorite" setting for the system components. For example, a favorite setting can be established for television programming, audio/video recordings, room temperature, hot tub controls, clock alarms, light/dimmer settings, web sites, news broadcasts, financial channels, or the like.

In embodiments, the user can establish a profile to create a "playlist." For example, a series of video or audio recordings can be prepared and/or stored for playback on, for example, television 112 or audio client 118. A sequence of graphic images or photographs can be prepare and/or stored for playback on, for example, monitor 116 or computer client 106. A playlist of other forms or media and/or multimedia can also be created according to embodiments of the present invention, as would be apparent to one skilled in the relevant art(s).

In embodiments, a profile can be created to establish a security protocol for the system components. For example, a profile can be created to block certain content from being accessed by designated users. Non-adult users, for instance, can be prevented from accessing designated television channels, web sites, areas (such as, lockable rooms, drawers, safes, etc.), or the like.

In embodiments, the present invention enables a single user to establish multiple profiles. Each of the multiple profiles can be tailored for context-sensitive activity. For instance, a user can create a profile for evening entertainment, which includes, without limitation, presets for lighting, audio/video presentations, security access warnings, hot tub controls, or the like. Another profile can be established for home office activities, which includes, without limitation, presets for a baby monitor, a playlist of classical recordings, coffee maker timer controls, or the like. A profile can be established for morning rituals, which includes, without limitation, presets for alarm/snooze controls, coffee maker timer controls, lighting, news broadcasts, or the like.

A user can also establish multiple profiles for use with other individuals. For example, a user can have a profile with security controls set to block certain televisions programming, web sites, audio recordings, or the like when in the company of minors. However, when in the company of adults, the user can recall another profile with more liberal security settings.

As such, the present invention enables various system components (e.g., controller client 110, etc.) to be user aware in addition to being location aware. Thus for example, controller client 110 can be customized per user based on the aforementioned user profiles. In embodiments, the user awareness functionality permits system 100 to implement "follow-me" system controls. For instance, "follow-me" video is implemented to transfer a selected video production to various displays throughout the controlled environment. The user would operate, for example, controller client 110 to select a video production (e.g., television show, DVD recording, or the like). The video production can be presented on controller client 110 (e.g., media viewer 710 described with reference to FIG. 7). As the user migrates from room to room within the controlled environment, system 100 tracks controller client 110 and retrieves a region profile for each region. Therefore, as the user enters a new region or room, a monitor 116 or television 112 located in the room will automatically start to display the video production selected by controller client 110.

Similarly, "follow-me" audio can be implemented by the present invention. As such, the user can operate, for example, controller client 110 to select an audio production (e.g., CD recording, radio broadcast, etc.). As the user migrates from room to room, the positioning techniques of the present invention enable system 100 to transfer the audio production to the audio clients 118, monitors 116, or the like that are located in the vicinity of controller client 110.

"Follow-me" lighting is another exemplary implementation of the present invention. As a user, carrying controller client 110, enters or leave a room, system 100 sends commands to dim or turn on/off the lights based on the profile settings.

VII. Exemplary System Implementation

FIGS. 1-7 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 8:
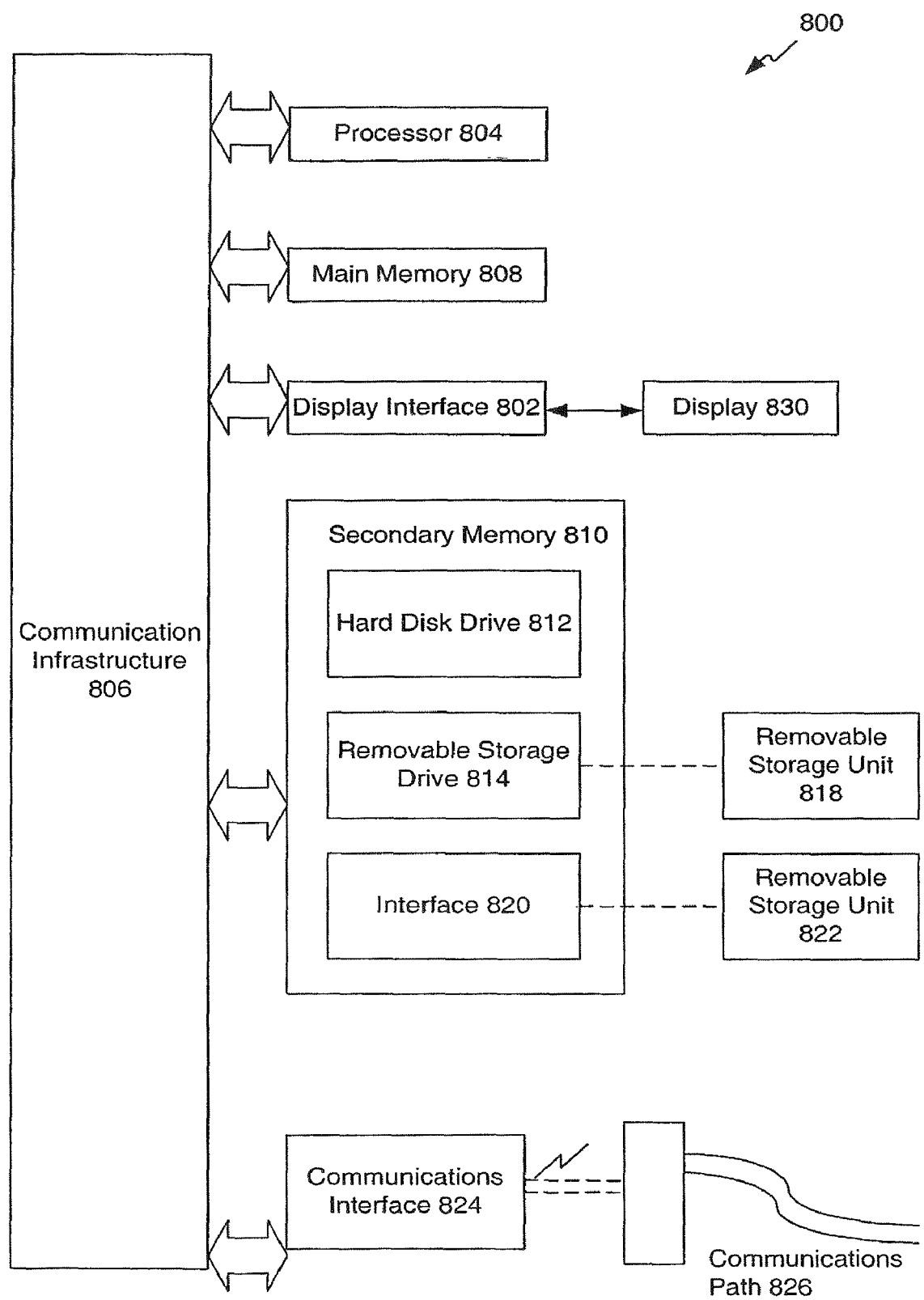
FIG. 8 is an example computer system useful for implementing the present invention.

Additionally, the present invention can be implemented in one or more computer systems or other processing systems, capable of carrying out the functionality described herein. Referring to FIG. 8, an example computer system 800 useful in implementing the present invention is shown. Various embodiments are described in terms of this exemplary computer system 800. After reading this description, it will become apparent to a person skilled in the relevant art(s) how to implement the invention using other computer systems and/or computer architectures.

The computer system 800 includes one or more processors, such as processor 804. Processor 804 can be a special purpose or a general purpose digital signal processor. The processor 804 is connected to a communication infrastructure 806 (e.g., a communications bus, cross-over bar, or network).

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to removable storage drive 814. As will be appreciated, the removable storage unit 818 includes a computer usable storage medium having stored therein computer software (e.g., programs or other instructions) and/or data.

In alternative embodiments, secondary memory 810 includes other similar means for allowing computer programs or other instructions to be loaded into computer system 800. Such means include, for example, a removable storage unit 822 and an interface 820. Examples of such means include a program cartridge and cartridge interface (such as that found in video game devices), a removable memory chip (such as, an EPROM or PROM) and associated socket, and other removable storage units 822 and interfaces 820 which allow software and data to be transferred from the removable storage unit 822 to computer system 800.

Computer system 800 can also include a communications interface 824. Communications interface 824 allows software and/or data to be transferred between computer system 800 and external devices. Examples of communications interface 824 include a modem, a network interface (such as an Ethernet card), a communications port, a PCMCIA slot and card, etc. Software and data is transferred via communications interface 824 and via a communications path (i.e., channel) 826. Communications path 826 can be implemented using wire or cable, fiber optics, a phone line, a cellular phone link, an RF link, free-space optics, and other communications channels.

In this document, the terms "computer program medium" and "computer usable medium" are used to generally refer to media such as removable storage unit 818, removable storage unit 822, and a hard disk installed in hard disk drive 812. These computer program products are means for providing software to computer system 800. The invention, in an embodiment, is directed to such computer program products.

Computer programs (also called computer control logic or computer readable program code) are stored in main memory 808 and/or secondary memory 810. Computer programs can also be received via communications interface 824. Such computer programs, when executed, enable the computer system 800 to implement the present invention as discussed herein. In particular, the computer programs, when executed, enable the processor 804 to implement the processes of the present invention, such as the method(s) implemented using residential control server 114, controller client 110, computer client 106, and/or other system components of system 100 described above, such as methods 500 and/or 600, for example. Accordingly, such computer programs represent controllers of the computer system 800.

In an embodiment where the invention is implemented using software, the software can be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover as previously discussed, it should be understood that the method, system, and computer program product of the present invention should not be limited to a residential environment. The present invention can be implemented in other types of environments having a central processing system for distributing media and sending command and/or control signals to a plurality of devices and/or applications dispersed throughout a designated region. In addition to a residence, the designated region includes, but is not limited to, office complexes, suite of small offices, production studios, warehouses, entertainment arenas, health care facilities, hotels, vacation resorts, aircrafts, ships, automobiles, or the like. Thus, the present invention should not be limited by any of the above-described exemplary embodiments, but should be defined only in accordance with the following claims and their equivalents.

What is claimed is:

1. A method for providing follow-me control of devices or applications in a controlled environment having one or more regions, comprising:
   accessing a locator code corresponding to a location of a portable device within the controlled environment;
   obtaining a user identity code corresponding to a user of the portable device;
   matching the locator code to a first region of the controlled environment, wherein the first region includes one or more devices or applications, wherein said devices or applications are controlled via customizable settings;
   using the user identity code to access a profile associated with said user, wherein the profile includes one or more default settings for said one or more devices or applications in the first region;
   automatically applying said default settings to said customizable settings corresponding to said first region and said profile to provide customized control of said one or more devices or applications;
   allowing the user to alter at least one of the customizable settings for said one or more devices or applications in the first region; and
   automatically applying said customizable settings to one or more of the devices or applications within a second region as said portable device is moved from the first region to the second region within said controlled environment,
   wherein said allowing step comprises presenting media corresponding to a request comprising presenting media from a home security system comprising at least one of a camera and a microphone.

2. The method of claim 1, wherein the presenting media further comprises opening an FTP document.

3. The method of claim 1,
   wherein said accessing further comprises accessing the locator code from a bar code.

4. A network controller, comprising:
   interfacing means for communicating with a control center and responsive to exchanging data and/or control signals with said control center, wherein said data and/or said control signals allow control of one or more network components positioned in a spatial location of the network controller, wherein said one or more network components are controlled via customizable settings;
   positioning means for determining the spatial location of the network controller;
   identification means for determining user awareness;
   profiling means for accessing a user-specific profile of default settings for said one or more network components;
   control means for automatically applying said default settings to said customizable settings based on said spatial location and said profile to provide customized control of said one or more network components and allowing a user to alter at least one customizable setting for said one or more network components;
   means for automatically applying said customizable settings to the one or more network components as the network controller is moved from one location to another location within a controlled environment;
   display means for presenting media corresponding to exchanges with said control center; and
   authentication means for determining said user awareness.

5. A system for managing a plurality of network components within a controlled environment, wherein the plurality of network components are controlled via customizable settings, comprising:
   a network control center configured to control the operations and/or functions of the plurality of network components;
   positioning means for tracking and/or monitoring a location or movement of at least one of the plurality of network components;
   profiling means for accessing a user-specific profile of default settings for said one or more network components, wherein said default settings are automatically applied to the customizable settings based on the location of said one or more network components; and
   altering means for allowing a user to alter at least one of the customizable settings for the plurality of network components, wherein the customizable settings are applied as the network control center is moved from one location to another location within said controlled environment;
   wherein the plurality of network components includes a controller means for interacting with said network control center and said positioning means,
   wherein said controller means sends a control request to one or more of the plurality of network components located within a vicinity of said controller means, and
   wherein said network control center comprises security means for interacting with a security system.

6. A tangible computer program readable medium having instructions stored thereon for causing a computer to manage a plurality of network components within a controlled environment, the instructions comprising:
   instructions for receiving or determining a location of a portable controller within the controlled environment, wherein said portable controller is one of the plurality of network components, wherein said plurality of network components are controlled via customizable settings;

instructions for specifying one or more of the plurality of network components located within a vicinity of said portable controller;

instructions for accessing a user-specific profile of default settings for said one or more network components;

instructions for applying said default settings to said customizable settings based on said location and said profile to provide customized control of said one or more of the plurality of network components and to allow a user to alter one customizable setting for said one or more of the plurality of network components, wherein said fourth computer readable program code means accesses a user-specific profile of customizable settings for said one or more network components is accessed;

instructions for applying said customizable settings as said portable controller is moved from one location to another location within said controlled environment; and instructions for allowing the execution of the user-specific profile to block access to at least one of a telephone number, a web site, a television channel, an audio recording, a video recording, and a secured area.

* * * * *